United States Patent
Wen

(10) Patent No.: US 9,203,250 B2
(45) Date of Patent: Dec. 1, 2015

(54) SNAP-FIT SEPARABLE MOBILE BACKUP POWER SUPPLY

(76) Inventor: Meichan Wen, ShenZhen (CN)

( * ) Notice: Subject to any disclaimer, the term of this patent is extended or adjusted under 35 U.S.C. 154(b) by 125 days.

(21) Appl. No.: 13/994,983

(22) PCT Filed: Feb. 20, 2012

(86) PCT No.: PCT/CN2012/000213
§ 371 (c)(1),
(2), (4) Date: Aug. 5, 2013

(87) PCT Pub. No.: WO2013/123613
PCT Pub. Date: Aug. 29, 2013

(65) Prior Publication Data
US 2014/0028258 A1     Jan. 30, 2014

(51) Int. Cl.
*H02J 7/00* (2006.01)
*H04M 1/02* (2006.01)

(52) U.S. Cl.
CPC ............ *H02J 7/0042* (2013.01); *H04M 1/0262* (2013.01); *H04M 1/0283* (2013.01)

(58) Field of Classification Search
CPC ................................ H02J 7/0042; H02J 7/0054
USPC ........................................................ 320/114
See application file for complete search history.

(56) References Cited

U.S. PATENT DOCUMENTS

| 7,576,514 | B2 * | 8/2009 | Hui | 320/108 |
| 8,917,057 | B2 * | 12/2014 | Hui | 320/108 |
| 2010/0045233 | A1 * | 2/2010 | Alameh et al. | 320/114 |
| 2014/0077753 | A1 * | 3/2014 | Wen | 320/103 |

\* cited by examiner

*Primary Examiner* — Sun Lin
(74) *Attorney, Agent, or Firm* — Jeanette Meng Nakagawa

(57) ABSTRACT

A snap-fit separable mobile phone backup power supply comprises a protective sleeve fitted with a battery-charging module. The battery-charging module further comprises a matching bottom cover and an isolation plate, forming a cavity to house a circuit motherboard and a rechargeable battery. The circuit motherboard is fitted with a terminal to accommodate a mobile phone's charging specificity. A terminal cover shields the terminal, and is fixed to the isolation plate. Various snap-fit connections are disclosed to secure the protective sleeve with the battery-charging module while charging the phone. The overall structure is compact, small, and portable.

6 Claims, 5 Drawing Sheets

SNAP-FIT SEPARABLE MOBILE BACKUP POWER SUPPLY

TECHNICAL FIELD

The present invention relates to the technical field of power supplies, and particularly relates to a snap-fit type separable mobile phone backup power supply for mobile phones.

BACKGROUND OF THE INVENTION

With the development of technology, personal consumer electronics, such as smart phones, are more and more powerful in functions. Although the smart phone can provide people with more convenience and choices, it also has to provide a battery with a larger capacity. Otherwise the battery carried by the mobile phone is easy to run out, and cannot provide enough endurance, for which reason a rechargeable battery capable of charging the battery in emergencies is needed.

The existing power supply is usually separated from the mobile phone, the power supply is connected to the mobile phone, so that it is inconvenient for the user to carry. At the same time, the appearance of the smart phone is more and more delicate, the electronic components are also more and more elaborate, and its function is more and more powerful. During use, the user prevents the smart phone casing from being scratched and reduces the influence of the external force on the performance of the smart phone, so the smart phone usually has to be provided with a protective sleeve. Since the smart phone protective sleeve does not have a power supply, the smart phone cannot be charged. Meanwhile, the mobile power supply or standby power supply often fails to protect the smart phone, and the connection has to be made through a connecting wire when the mobile power supply or the standby power supply is used, so that it is inconvenient to use and carry.

BRIEF SUMMARY OF EMBODIMENTS OF THE INVENTION

In the present invention, the technical problem to be mainly solved is to provide a snap-fit type separable mobile phone backup power supply, which can provide the communication terminal with power again, prolong the endurance of the battery, be of a compact structure, and facilitate using and carrying.

To solve the above problem, the present invention provides a snap-fit type separable mobile phone backup power supply, including a protective sleeve, wherein the mobile power supply further includes a battery charging module which is fixed to the protective sleeve through a snap-fit device, and also includes a bottom cover and an isolation plate matched with and fixed to the bottom cover, a circuit motherboard and a battery connected with the circuit motherboard, wherein the bottom cover is provided with a cavity for accommodating the battery and the circuit motherboard, the isolation plate is arranged above the circuit motherboard and the battery, the circuit motherboard is provided with a terminal matched with the mobile phone, and a terminal cover fixed to the isolation plate is arranged above the terminal; and the snap-fit device includes a snap-fit component which is arranged on the isolation plate or the bottom cover, and which is snap-fit and fixed to a fixation hole in the protective sleeve.

Furthermore, the snap-fit type component is T-shaped in a sectional view along the centerline thereof, and the fixation hole is 8-shaped or shaped like a bottle gourd, wherein one side of the fixation hole which is located at the upper edge of the protective sleeve is of a step structure.

In the snap-fit type separable mobile phone backup power supply disclosed by the present invention, the mobile power supply further includes a battery charging module which is snap-fit and fixed to the protective sleeve through a snap-fit device, and which includes a bottom cover and an isolation plate matched with and fixed to the bottom cover, a circuit motherboard and a battery connected with the circuit motherboard, wherein the bottom cover is provided with a cavity for accommodating the battery and the circuit motherboard, the isolation plate is arranged above the circuit motherboard and the battery, the circuit motherboard is provided with a terminal matched with the mobile phone, and a terminal cover fixed to the isolation plate is arranged above the terminal. Since the protective sleeve is fixed in a snap-fit manner to the bottom cover for accommodating the power supply, and the power supply is connected with the mobile phone at the same time through the terminal matched with the mobile phone, on the one hand, the mobile phone can be charged by the power supply, the standby or use time of the mobile phone is prolonged, no connecting wire is needed in use so as to facilitate the use of the user, the structure is compact, the size is small, and it is convenient for the user to carry; on the other hand, it is convenient to separate the protective sleeve from the bottom cover, and then it is convenient for the user to choose the personalized color of the protective sleeve according to the needs.

BRIEF DESCRIPTION OF THE DRAWINGS

The present invention, in accordance with one or more various embodiments, is described in detail with reference to the following figures. The drawings are provided for purposes of illustration only and to merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

From time-to-time, the present invention is described herein in terms of example environments. Description in terms of these environments is provided to allow the various features and of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
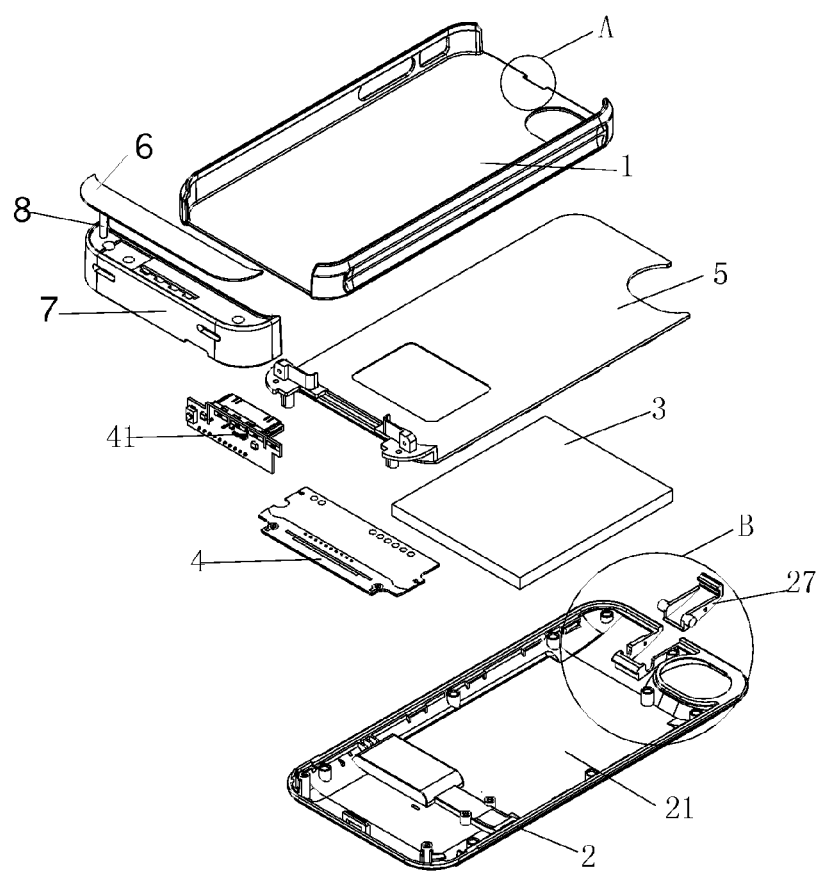
FIG. 1 is an exploded structural schematics of a snap-fit type separable mobile phone backup power supply, according to some embodiments of the present invention.

As shown in FIG. 1, the present invention provides an embodiment of a snap-fit type separable mobile phone backup power supply.

The snap-fit type separable mobile phone backup power supply comprises: a protective sleeve 1 and a battery-charging module, which is fitted onto the protective sleeve 1. The battery-charging module further comprises a matching bottom cover 2 and an isolation plate 5. A circuit motherboard 4 is connected to a rechargeable battery 3. Battery 3 and circuit motherboard 4 reside in a cavity 21 between the bottom cover 2 and the isolation plate 5. The circuit motherboard 4 is fitted with a terminal 41 to accommodate a mobile phone's charging specificity. A terminal cover 7 shields terminal 41, and is fixed to the isolation plate 5.

The circuit motherboard 4 and terminal 41 provides an interface for charging a mobile phone. Terminal 41 can facilitate users to charge the battery when the battery is getting low with a push button. The terminal cover 7 is provided with a translucent PVC sheet 6, which is in contact with a push-button (not shown in the drawings) on the circuit motherboard 4 through a press-button handle 8. The translucent PVC sheet 6 is fixed to the terminal cover 7 via double-sided adhesives. Light from the circuit motherboard 4 can pass through sheet 6 and facilitates the operation of the phone.

Figure 2:
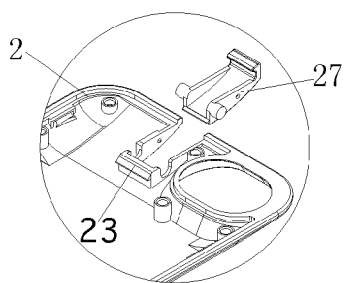
FIG. 2 is an enlarged structural schematic diagram of area B in FIG. 1.
Figure 3:
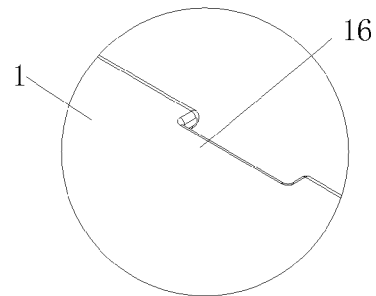
FIG. 3 is an enlarged structural schematic diagram of area A in FIG. 1.

FIGS. 2 and 3 in combination illustrates the snap-fit connection between the protective sleeve 1 and the batter-charging module. FIG. 2 (enlarged area of B in FIG. 1) illustrates a movable clasp 27. FIG. 3 (enlarged area of A in FIG. 1) illustrates a corresponding slot 16, which receives clasp 27, so as to bring the protective sleeve and the battery-charging module together and secure the two during charging.

When the mobile phone is to be charged, the battery charging module is fixed onto the protective sleeve 1 through the snap-fit connection, so that the battery-charging module is in close contact with the protective sleeve 1. The mobile phone, at this time, is connected to battery 3 through terminal 41 on the battery-charging module in order to realize the charging. When the mobile phone does not have to be charged, the battery-charging module can be separated from the protective sleeve 1 by releasing the clasp 27. The battery-charging module can increase the standby or use time of the mobile phone with no additional connecting wire. The structure of the batter-charging module is compact, small, and portable. Since the battery-charging module is also separable from the protective sleeve, it does not prohibit a user from choosing personalized design for the protective sleeve according to individual preferences.

Figure 4:
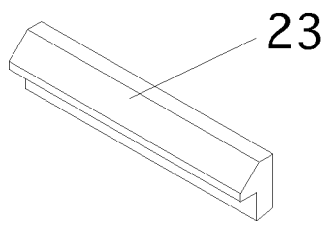
FIG. 4 is an enlarged structural schematic diagram of a component for fixing the battery.

FIG. 4, illustrate a fixing clip 23 for securing battery 3 onto the bottom cover 2, and at the same time may facilitate the assembling of the backup battery-charging module.

Figure 5:
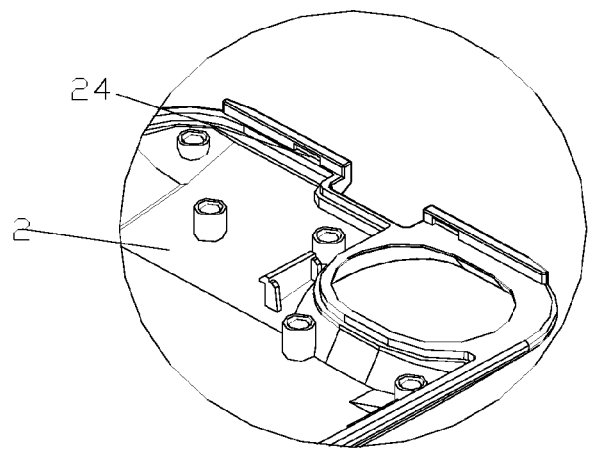
FIG. 5 is a structural schematic diagram of another embodiment of the snap-fit connection.

In another embodiment of the present invention, FIG. 5 illustrates a snap-fit connection comprising at least two concave troughs 24 arranged at the upper end of the bottom cover 2. The troughs 24 can be fitted onto a convex clamping strip at the corresponding upper end of the protective sleeve 1.

Figure 6:
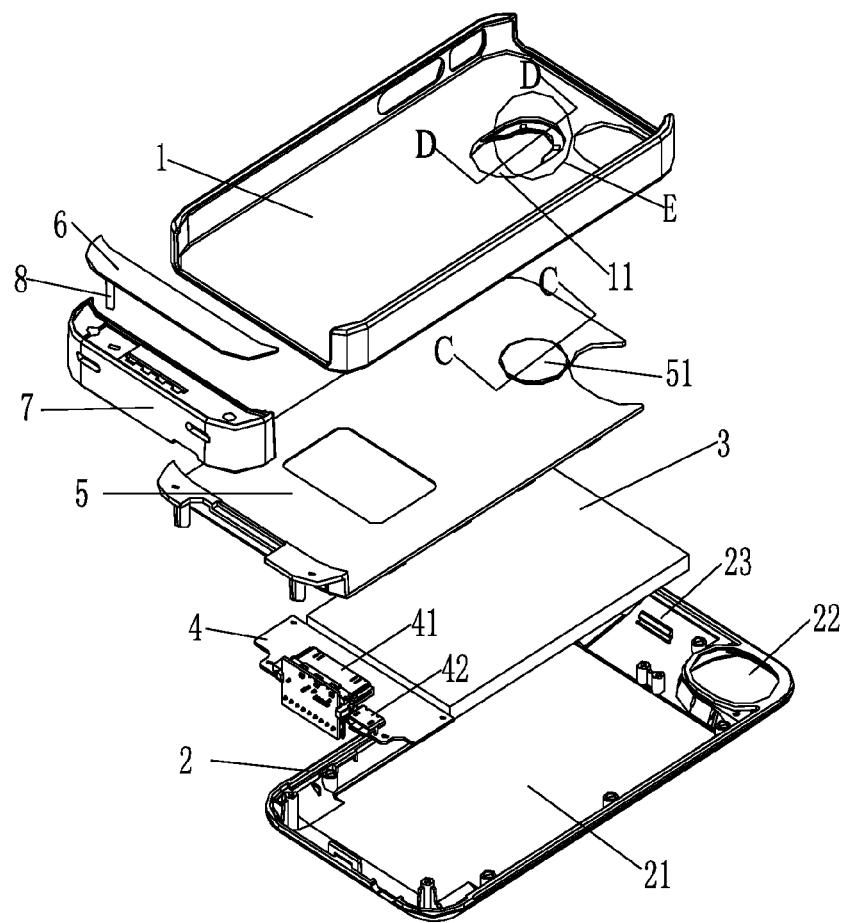
FIG. 6 is a structural schematic diagram of yet another embodiment of the snap-fit type separable mobile phone backup power supply, according to some embodiments of the present invention.

In yet another embodiment of the present invention, FIG. 6 illustrates a snap-fit type separable mobile phone backup power supply comprising a protective sleeve 1 and a battery-charging module, which is fitted onto the protective sleeve 1. The battery-charging module further comprises a matching bottom cover 2 and an isolation plate 5. A circuit motherboard 4 is connected to a battery 3. Battery 3 and circuit motherboard 4 reside in a cavity 21 between the bottom cover 2 and the isolation plate 5. The circuit motherboard 4 is fitted with a terminal 41 to accommodate a mobile phone's charging specificity. A terminal cover 7 shields terminal 41, and is fixed to the isolation plate 5.

Figure 7:
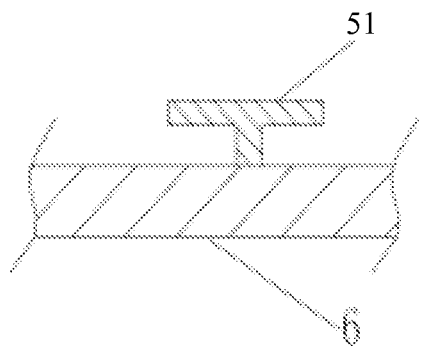
FIG. 7 is a sectional structural schematic diagram along the C-C direction in FIG. 6, according to some embodiments of the present invention.
Figure 8:
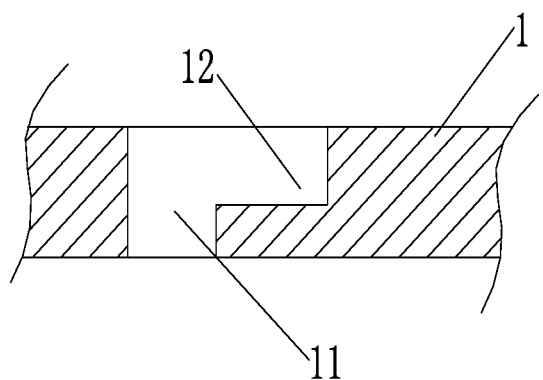
FIG. 8 is a sectional structural schematic diagram along the D-D direction in FIG. 6, according to some embodiments of the present invention.

As shown in FIG. 7 and FIG. 8, the snap-fit connection comprises a snap-fit component 51, which can be fixed onto either the isolation plate 5 or the bottom surface of protective sleeve 1. The snap-fit component 51 can fit through an opening 11 on the bottom surface of the protective sleeve 1. FIG. 7 illustrates a T-shaped cross section of the snap-fit component 51. FIG. 8 illustrates a cross section along the centerline of the opening 11. The opening itself can be 8-shaped, curved in a profile of a bottle gourd, or narrowed to prevent the snap-fit component from slipping off. The top part of the snap-fit component 51 can be inserted into a step structure 12 (FIG. 8) at the edge of the opening, thus securing the battery-charging unit to the bottom of the protective sleeve.

In use, the snap-fit component 51 penetrates through opening 11 and then moves downward, so that the snap-fit component 51 is matched with the step structure 12 of the edge of the opening 11. Since after the snap-fit component 51 is matched with the step structure 12 of the fixation hole 11, the upper part of the snap-fit component 51 is greater than the diameter of the fixation hole 11 in that position, the battery charging module may be well fixed to the protective sleeve 1.

The circuit motherboard 4 is fitted with a terminal 41 to accommodate a mobile phone's charging specificity. The structure is compact, small, and portable.

Figure 9:
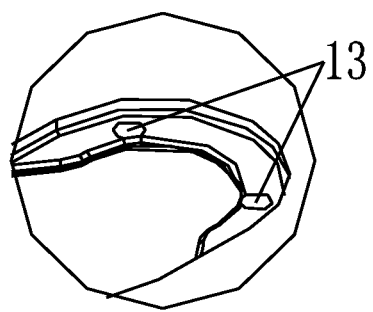
FIG. 9 is an enlarged structural schematic diagram of area E in FIG. 6.

FIG. 9 illustrates a step structure 12 with two symmetrically located protrusions 13. The protrusions 13 allow the snap-fit component 51 to be more firmly fixed to the protective sleeve 1. The circuit motherboard 4 is further provided with a charging interface 42 for charging the battery-charging module.

The bottom cover 2 is further provided with a fixing clip 23 for fixing the battery 3, and the fixing clip 23 allows the battery to be secured, and at the same time may facilitate assembling of the backup battery. The bottom cover 2 is also provided with a through hole 22 matched with a mobile phone's lens and allows users to take photos without obstruction, even when the mobile phone is being charged by the battery-charging module.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to achieve the desired features of the present invention. Also, a multitude of different constituent module names other than those depicted herein can be applied to the various partitions.

Although the invention is described above in terms of various exemplary embodiments and implementations, it should be understood that the various features, aspects and functionality described in one or more of the individual embodiments are not limited in their applicability to the particular embodiments with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A separable backup power supply for a mobile phone, the backup power supply comprising:
    a protective sleeve;
    a battery-charging module, wherein the battery-charging module comprises;
        a bottom cover;
        a matching isolation plate fitted on top of the bottom cover to create a cavity to house a rechargeable battery and a circuit motherboard;
        a terminal fitted onto one end of the rechargeable battery and the circuit motherboard to accommodate a mobile phone's charging specificity; and
        a translucent terminal cover;
    a snap-fit connection to securely join the protective sleeve with the battery-charging module, and to transfer power from the rechargeable battery to the mobile phone.

2. The backup power supply of claim 1, wherein the snap-fit connection further comprises a movable clasp on the bottom cover, and a corresponding receiving slot on the protective sleeve.

3. The backup power supply of claim 1, wherein the snap-fit connection further comprises:
    a T-shaped snap-fit component fixed on the isolation plate;
    a narrowed opening on a bottom surface of the protective sleeve;
    a step structure along an edge of the opening on the bottom surface of the protective sleeve to receive the snap-fit component; and
    at least one pair of protrusions along the step structure.

4. The backup power supply of claim 1, wherein the snap-fit connection further comprises:
    at least one pair of concave troughs along an end portion of the bottom cover; and
    at least one pair of clamping strips to engage the troughs along corresponding edges of the protective sleeve.

5. The backup power supply of claim 1, wherein the bottom cover of the battery-charging module further comprises at least one fixing clip to secure the rechargeable battery.

6. The backup power supply of claim 1, wherein corresponding locations on the protective sleeve and the battery-charging module are hollowed out to accommodate camera lens for the mobile phone.

* * * * *